(12) United States Patent
Godo et al.

(10) Patent No.: US 11,987,137 B2
(45) Date of Patent: May 21, 2024

(54) DRIVE AXLE SYSTEM AND METHOD OF CONTROL

(71) Applicant: ArvinMeritor Technology, LLC, Troy, MI (US)

(72) Inventors: Edvin Godo, Troy, MI (US); Banuchandar Muthukumar, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/877,077

(22) Filed: Jul. 29, 2022

(65) Prior Publication Data

US 2024/0034157 A1   Feb. 1, 2024

(51) Int. Cl.
| | |
|---|---|
| *B60K 1/02* | (2006.01) |
| *B60L 7/18* | (2006.01) |
| *B60L 15/20* | (2006.01) |
| *B60L 58/10* | (2019.01) |
| *F16H 61/16* | (2006.01) |

(52) U.S. Cl.
CPC ............ *B60L 15/2054* (2013.01); *B60K 1/02* (2013.01); *B60L 7/18* (2013.01); *B60L 15/20* (2013.01); *B60L 15/2045* (2013.01); *B60L 58/10* (2019.02); *F16H 61/16* (2013.01); *B60L 2240/545* (2013.01)

(58) Field of Classification Search
CPC ........ B60L 15/2054; B60L 7/18; B60L 15/20; B60L 15/2045; B60L 58/10; B60L 2240/545; B60K 1/02
See application file for complete search history.

(56) References Cited

U.S. PATENT DOCUMENTS

| | | | |
|---|---|---|---|
| 10,989,288 B1 | 4/2021 | Ghatti et al. | |
| 11,002,352 B2 | 5/2021 | Ghatti et al. | |
| 11,038,396 B2 | 6/2021 | Raya et al. | |
| 11,207,976 B2 | 12/2021 | Ghatti et al. | |
| 11,209,072 B2 | 12/2021 | Ghatti et al. | |
| 11,220,176 B1 | 1/2022 | Cradit et al. | |
| 11,680,639 B1 * | 6/2023 | Godo | B60L 15/2054 477/3 |
| 2012/0089290 A1 * | 4/2012 | Kato | B60L 3/0046 701/22 |
| 2018/0326971 A1 * | 11/2018 | Lindström | B60K 6/48 |
| 2018/0354490 A1 * | 12/2018 | Moriya | B60W 10/06 |
| 2020/0189398 A1 * | 6/2020 | Suzuki | B60T 8/1766 |
| 2020/0361303 A1 | 11/2020 | Meyer et al. | |
| 2021/0053549 A1 * | 2/2021 | Chen | B60W 10/08 |
| 2021/0291646 A1 | 9/2021 | Lorenz et al. | |

(Continued)

OTHER PUBLICATIONS

Cradit et al, U.S. Appl. No. 17/308,307, filed May 5, 2021, 46 pages.

(Continued)

*Primary Examiner* — Tisha D Lewis
(74) *Attorney, Agent, or Firm* — Brooks Kushman PC (57) ABSTRACT

A method of controlling a drive axle system. The drive axle system includes a first axle assembly and a second axle assembly that are electrically connected to the same electric power source or different electric power sources. The method operates the axle assemblies within power and current limits of an associated electric power source.

20 Claims, 4 Drawing Sheets

(56) References Cited

U.S. PATENT DOCUMENTS

2022/0065346 A1* 3/2022 Chen .................... F16H 61/684
2022/0176965 A1   6/2022 Gesang et al.

OTHER PUBLICATIONS

Partial European Search Report dated Dec. 11, 2023, for related European Appln. No. 23187510.5 17 Pages.
Extended European Search Report dated Mar. 14, 2024 for related European Appln. No. 23187510.5; 18 Pages.

* cited by examiner

DRIVE AXLE SYSTEM AND METHOD OF CONTROL

TECHNICAL FIELD

This relates to a drive axle system for a vehicle and a method of control.

BACKGROUND

A drive axle system having electric motors is disclosed in United States Patent Publication No. 2021/0291646.

SUMMARY

A method of controlling a drive axle system is provided. The method includes determining a power limit and a current limit of an electric power source of the drive axle system. The drive axle system includes a first axle assembly and a second axle assembly. The first axle assembly has a first transmission and a first electric motor. The first electric motor is configured to provide torque to the first transmission. The second axle assembly has a second transmission and a second electric motor. The second electric motor is configured to provide torque to the second transmission. The first electric motor and the second electric motor are electrically connected to the electric power source. The method includes determining a power demand and a current demand associated with a request for torque to be provided by the drive axle system. The method also includes operating the first electric motor and the second electric motor with the electric power source to provide torque to the first axle assembly and the second axle assembly without exceeding the power limit and the current limit.

Determining the power limit and the current limit of the electric power source may be based on the temperature of the electric power source.

Operating the first and second electric motors may include comparing the power demand to a power limit and limiting the power provided to the first and second electric motors to the power limit when the power demand exceeds the power limit.

Operating the first and second electric motors may include comparing the current demand to the current limit and limiting the current provided to the first and second electric motors to the current limit when the current limit exceeds the current demand.

A method of controlling a drive axle system is provided. The method includes determining a regeneration power limit and a regeneration current limit of an electric power source of the drive axle system. The drive axle system includes a first axle assembly and a second axle assembly. The first axle assembly has a transmission and a first electric motor. The first electric motor is configured to provide torque to the first transmission. The second axle assembly has a second transmission and a second electric motor. The second electric motor is configured to provide torque to the second transmission. The first electric motor and the second electric motor are electrically connected to the electric power source. The method includes providing regeneration torque with the first electric motor to the first transmission to reduce a rotational speed of a gear of the first transmission. Increased propulsion torque is provided with the second electric motor to the second transmission in preparation for a gear upshift of the first transmission. The method determines whether the regeneration power limit of the electric power source is reached when providing regeneration torque and provides regeneration torque with the first electric motor without exceeding the regeneration power limit when the regeneration power limit is reached. The method determines whether the regeneration current limit of the electric power source is reached when providing regeneration torque and provides regeneration torque with the first electric motor without exceeding the regeneration current limit when the regeneration current limit is reached.

Determining whether the regeneration power limit is reached may include limiting the regeneration torque provided by the first electric motor to not exceed the regeneration power limit. Determining whether the regeneration current limit is reached may include limiting the regeneration torque provided by the first electric motor to not exceed the regeneration current limit.

The method may further comprise determining whether the gear upshift of the first transmission is completable and executing gear upshift by disengaging the first gear ratio of the first axle assembly and engaging the gear to provide a second year ratio of the first axle assembly when the gear upshift of the first transmission is completable.

The method may include providing propulsion torque with the first electric motor to the first transmission to increase the rotational speed of a gear of the first transmission. The method may also include reducing the propulsion torque provided with the second electric motor to the second transmission in preparation for a gear upshift of the second transmission after completing the gear upshift of the first transmission.

The method may include not executing the gear upshift of the first transmission when the first electric motor does not slow rotation of the gear of the first transmission by sufficient amount to complete the gear upshift when regeneration torque is provided by the first electric motor.

A method of controlling a drive axle system is provided. The method includes determining a first propulsion power limit and a first propulsion current limit of a first electric power source of the drive axle system. The method also includes determining a second propulsion power limit and a second propulsion current limit of a second electric power source of the drive axle system. The drive axle system includes a first axle assembly and a second axle assembly. The first axle assembly has a first transmission and a first electric motor. The first electric motor is configured to provide torque to the first transmission. The second axle assembly has a second transmission and a second electric motor. The second electric motor is configured to provide torque to the second transmission. The first electric motor is electrically connected to the first electric power source and is not electrically connected to the second electric power source. The second electric motor is electrically connected to the second electric power source and is not electrically connected to the first electric power source. The method includes providing propulsion torque with the first electric motor without exceeding the first propulsion power limit when a first power request based on a propulsion torque command is greater than the first propulsion power limit. The method includes providing propulsion torque with the first electric motor without exceeding the first propulsion current limit when a first current request based on the propulsion torque command is greater than the first propulsion current limit. The method includes providing propulsion torque with the second electric motor without exceeding the second propulsion power limit when a second power request based on the propulsion torque command is greater than the second propulsion power limit. The method includes providing propulsion torque with the second electric motor without exceeding the second propulsion current limit when a second current request based on the propulsion torque command is greater than the second propulsion current limit.

The method may include providing propulsion torque with the first electric motor at the first propulsion power limit when the first power request is greater than the first propulsion power limit. The method may include providing propulsion torque with the first electric motor at the first propulsion current limit when the first current request is greater than the first propulsion current limit. The method may include providing propulsion torque with the second electric motor that is greater than the propulsion torque provided by the first electric motor. Propulsion torque may be split between the first axle assembly and the second axle assembly such that the propulsion torque that is not provided by the first electric motor may be provided by the second electric motor.

The method may include providing propulsion torque with the second electric motor at the second propulsion power limit when the second power request is greater than the second propulsion power limit. The method may include providing propulsion torque with the second electric motor at the second propulsion current limit when the second current request is greater than the second propulsion current limit. The method may include providing propulsion torque with the first electric motor that is greater than the propulsion torque provided by the second electric motor. Propulsion torque may be split between the first axle assembly and the second axle assembly such that the propulsion torque that is not provided by the second electric motor is provided by the first electric motor.

Propulsion torque may be split in a predetermined ratio between the first axle assembly and the second axle assembly when the first power request does not exceed the first propulsion power limit, the first current request does not exceed the first propulsion current limit, the second power request does not exceed the second propulsion power limit, and the second current request does not exceed the second propulsion current limit. The predetermined ratio may split propulsion torque evenly between the first axle assembly and the second axle assembly.

A method of controlling a drive axle system is provided. The method includes determining a first regeneration power limit and a first regeneration current limit of a first electric power source of the drive axle system. The method includes determining a second regeneration power limit and a second regeneration current limit of a second electric power source of the drive axle system. The drive axle system includes a first axle assembly and a second axle assembly. The first axle assembly has a first transmission and a first electric motor. The first electric motor is configured to provide torque to the first transmission. The second axle assembly has a second transmission and a second electric motor. The second electric motor is configured to provide torque to the second transmission. The first electric motor is electrically connected to the first electric power source and is not electrically connected to the second electric power source. The second electric motor is electrically connected to the second electric power source and is not electrically connected to the first electric power source. The method includes providing no regeneration torque the first electric motor when a first power request based on the regeneration torque command exceeds the first regeneration power limit, a first current request based on the regeneration torque command exceeds the first regeneration current limit, or both. The method includes providing no regeneration torque with the second electric motor when a second power request based on the regeneration torque command exceeds the second regeneration power limit, a second current request based on the regeneration torque command exceeds the second regeneration power limit, or both.

The method may include providing regeneration torque with the first electric motor at the first regeneration power limit when the first power request is greater than the first regeneration power limit. The method may include providing regeneration torque with the first electric motor at the first regeneration current limit when the first current request is greater than the first regeneration current limit. The method may include providing regeneration torque with the second electric motor that is greater than the regeneration torque provided by the first electric motor. The regeneration torque may be split between the first axle assembly and the second axle assembly such that regeneration torque that is not provided by the first electric motor is provided by the second electric motor.

The method may include providing regeneration torque with the second electric motor at the second regeneration power limit when the second power request is greater than the second regeneration power limit. The method may include providing regeneration torque with the second electric motor at the second regeneration current limit when the second current request is greater than the second regeneration current limit. The method may include providing regeneration torque with the first electric motor that is greater than the regeneration torque provided with the second electric motor.

DETAILED DESCRIPTION

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a" and "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
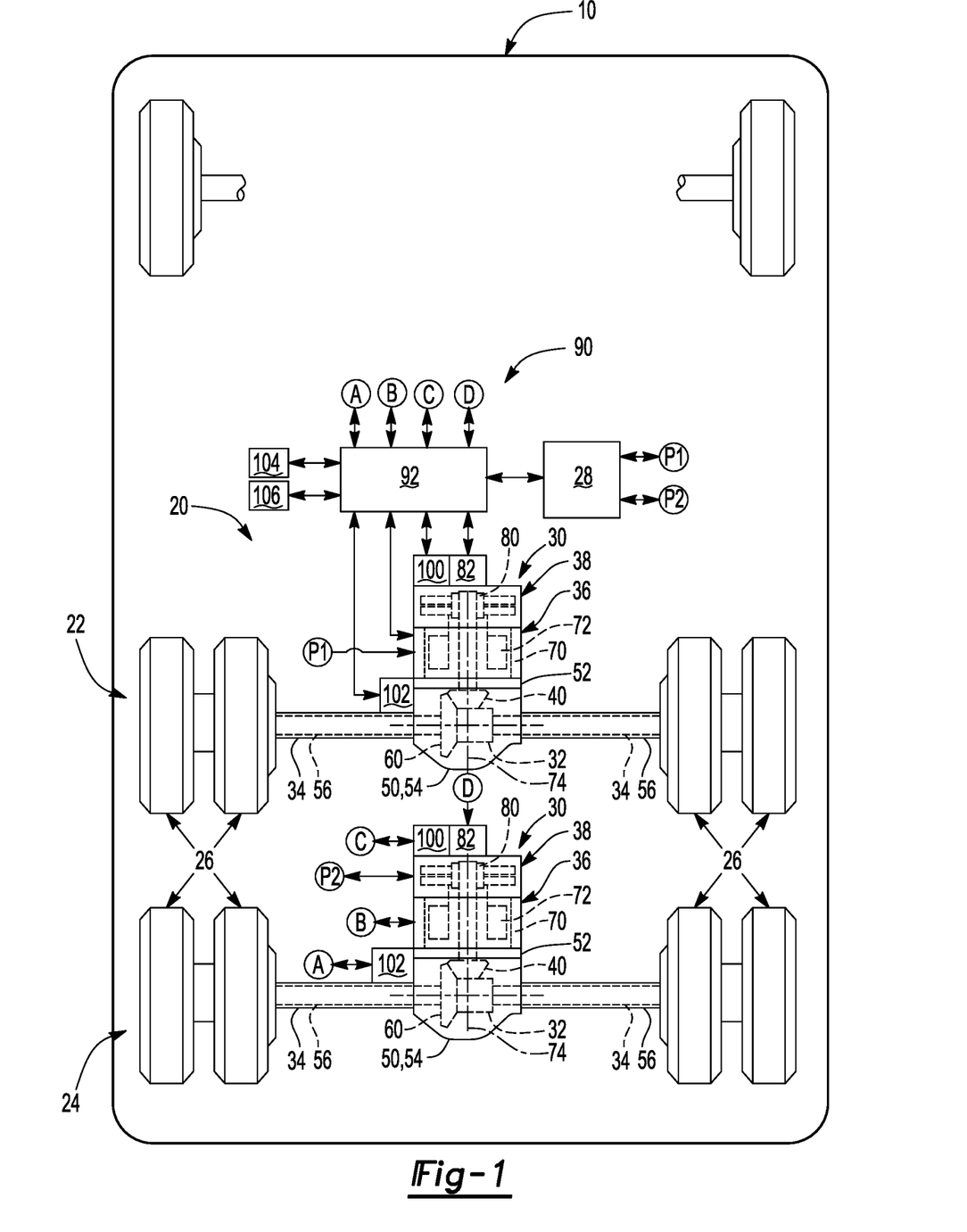
FIG. 1 is a schematic representation of a vehicle having a drive axle system that includes first and second axle assemblies that are electrically connected to a common power source.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments. The vehicle 10 includes a drive axle system 20.

The drive axle system 20 includes a plurality of axle assemblies, such as a front axle assembly 22 and a rear axle assembly 24. The front axle assembly 22 and the rear axle assembly 24 are drive axle assemblies. A drive axle assembly may be configured to provide torque to one or more wheel assemblies 26 that may be rotatably supported on the axle assembly. A wheel assembly 26 may include a tire disposed on a wheel. The drive axle system 20 may also include or be associated with an electric power source 28, such as a battery, capacitor, and the like.

In at least one configuration, the front axle assembly 22 and the rear axle assembly 24 may generally be disposed near each other and may be positioned toward the rear of the vehicle 10, similar to a conventional tandem axle arrangement. However, unlike a conventional tandem axle arrangement, the front axle assembly 22 and the rear axle assembly 24 are not operatively connected to each other and do not receive torque from the same electric motor. As such, the front axle assembly 22 and the rear axle assembly 24 are not connected in series with each other with a shaft, such as a prop shaft that may connect an output of the front axle assembly 22 with an input of the rear axle assembly 24. It is also contemplated that the front axle assembly 22 and the rear axle assembly 24 may be arranged in a different manner, such as with either or both axle assemblies being disposed near the front of the vehicle.

The front axle assembly 22 and the rear axle assembly 24 may have similar or identical configurations. For example, both axle assemblies 22, 24 include a housing assembly 30, a differential assembly 32, a pair of axle shafts 34, an electric motor 36, a transmission 38, a drive pinion 40, or combinations thereof. The positioning of the differential assembly 32, the electric motor 36, and/or the transmission 38 may differ from that shown. For instance, the differential assembly 32 may be positioned between the electric motor 36 and the transmission 38.

The housing assembly 30 receives various components of the axle assembly. In addition, the housing assembly 30 may facilitate mounting of the axle assembly to the vehicle 10. In at least one configuration, the housing assembly 30 may include an axle housing 50 and a differential carrier 52.

The axle housing 50 may receive and support the axle shafts 34. In at least one configuration, the axle housing 50 may include a center portion 54 and at least one arm portion 56.

The center portion 54 may be disposed proximate the center of the axle housing 50. The center portion 54 may define a cavity that may receive the differential assembly 32.

One or more arm portions 56 may extend from the center portion 54. For example, two arm portions 56 may extend in opposite directions from the center portion 54 and away from the differential assembly 32. The arm portions 56 may each have a hollow configuration or tubular configuration that may extend around and may receive a corresponding axle shaft 34 and may help separate or isolate the axle shaft 34 from the surrounding environment. A wheel hub may be rotatably disposed on an arm portion 56 and operatively connected to an axle shaft 34. A wheel assembly 26 may be mounted to the wheel hub.

The differential carrier 52 may be mounted to the center portion 54 of the axle housing 50. The differential assembly 32 may be rotatably supported on the differential carrier 52.

The differential assembly 32 is disposed in the housing assembly 30. For instance, the differential assembly 32 may be disposed in the center portion 54 of the axle housing 50. The differential assembly 32 may transmit torque to the axle shafts 34 of the axle assembly and permit the axle shafts and wheel assemblies 26 to rotate at different velocities in a manner known by those skilled in the art. For example, the differential assembly 32 may have a ring gear 60 that may be fixedly mounted on a differential case. The ring gear 60 and the differential case may be rotatable about a differential axis. The differential case may receive differential gears that may be operatively connected to the axle shafts 34.

The axle shafts 34 are configured to transmit torque between the differential assembly 32 and a corresponding wheel hub. For example, two axle shafts 34 may be provided such that each axle shaft 34 extends through a different arm portion 56 of axle housing 50. The axle shafts 34 may be rotatable about an axis, such as a wheel axis or the differential axis.

The electric motor 36 is configured to provide torque, such as propulsion torque or regenerative braking torque. Propulsion torque may be used to propel the vehicle 10, such as in a forward or backward direction. Propulsion torque may also be used to hold the vehicle in a stationary position or to help reduce or limit vehicle rollback, such as on an inclined surface. Regenerative braking may provide a regenerative braking torque, which may also be referred to as regenerative brake torque. Regenerative braking may capture kinetic energy when the electric motor 36 is used to brake or slow the velocity of the vehicle 10. Recovered energy may be transmitted from the wheel assemblies 26 to drive the electric motor 36. Thus, the electric motor 36 may function as a generator and may be used to charge the electric power source 28. The electric motor 36 may be electrically connected to the electric power source 28 via an inverter in a manner known by those skilled in the art. "Electrically connected" is used in the context of providing electrical energy to drive an electric power source or providing electrical energy from the electric power source to the electrical power source rather than a control system or other component or subsystem that may be wired to the electrical power source and the electric motor to monitor or control operation of the drive axle system 20. Electrical connections between the front axle assembly 22 and the rear axle assembly 24 and the electric power source 28 are represented with connection symbols P1 and P2, respectively. In the configuration shown in FIG. 1, the electric motor 36 of the front axle assembly 22 and the electric motor 36 of the rear axle assembly 24 are both electrically connected to a common electric power source 28.

The electric motor 36 may be mounted to or positioned inside of the housing assembly 30. The electric motor 36 includes a stator 70 and a rotor 72. The stator 70 may be fixedly positioned with respect to the housing assembly 30. The stator 70 may encircle the rotor 72. The rotor 72 is rotatable about an axis 74 with respect to the stator 70.)

The transmission 38 facilitates the transmission of torque between the electric motor 36 and the drive pinion 40. Torque transmission may be bidirectional. The transmission 38 may provide gear reduction and multiple gear ratios between the rotor 72 and the drive pinion 40. The transmission 38 may be of any suitable type. For instance, the transmission 38 may be a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352 and 11,209,072. Examples of an axle assembly having a dual countershaft transmission is disclosed in U.S. Pat. Nos. 10,989,288, 11,207,976, and 11,220,176. Examples of an axle assembly having an epicyclic transmission are disclosed in U.S. Pat. No. 11,038,396 and U.S. patent application Ser. No. 17/308,307. The disclosures of the references in the preceding three sentences are hereby incorporated in their entirety by reference herein. The transmission 38 may include a clutch 80 and a clutch actuator 82.

A clutch 80 controls rotation of one part with respect to another part. For instance, a clutch may connect and disconnect two parts, such as a driving part and a driven part. A clutch may have any suitable configuration. For example, a clutch 80 may be configured as a friction clutch and will primarily be described in the context of being a dog clutch or a spline clutch. A clutch 80 facilitates the engagement and disengagement of a component of the transmission 38 to provide a desired gear ratio. For example, a clutch may selectively couple a gear of a countershaft transmission to a shaft to permit torque transmission via that gear, and hence with an associated gear ratio, and may disengage or be decoupled from that gear to disable torque transmission via that gear. Similarly, a clutch may engage a component of an epicyclic gear set, such as a sun gear, to provide a first gear ratio and may engage another component, such as a planet gear carrier, to provide a second gear ratio. It is contemplated that the same clutch or different clutches may be used to provide different gear ratios. For simplicity, the clutch 80 will primarily be described in the context of a clutch that may move with respect to the drive pinion 40 or slide along the drive pinion 40 between a first position and a second position in which the clutch 80 couples or operatively connects different components to the drive pinion 40. For instance, the clutch 80 may couple a sun gear of an epicyclic gear set or a first gear of a countershaft gear set to the drive pinion 40 when in the first position and may couple a planet gear carrier of an epicyclic gear set or a second gear of a countershaft gear set to the drive pinion 40 when in a second position. The clutch 80 may also be positionable in a neutral position in which the clutch 80 does not operatively connect or transmit torque between the transmission 38 and the drive pinion 40.

The clutch actuator 82 may actuate the clutch 80. For instance, the clutch actuator 82 may actuate the clutch 80 between a first position, a neutral position, a second position, or combinations thereof. For example, the clutch actuator 82 may move a clutch 80 between two positions, such as the first position and the neutral position, or all three positions. In at least one configuration, the clutch actuator 82 may move the clutch 80 along an axis, such as the axis 74, a countershaft axis, or the like. The clutch actuator 82 may be mounted on or inside the housing assembly 30.

The drive pinion 40 operatively connects differential assembly 32 and the transmission 38. The drive pinion 40 may be received in the housing assembly 30 and may transmit torque between the differential assembly 32 and a transmission 38. The drive pinion 40 may be rotatable about an axis, such as the axis 74, and may have a gear portion that has teeth that meshes with teeth of the ring gear 60 of the differential assembly 32. Torque may be transmitted between the transmission 38 and the drive pinion 40 when the drive pinion 40 is operatively connected to the transmission 38. For example, torque that is provided from the electric motor 36 to the transmission 38 and to the drive pinion 40 may be transmitted to the ring gear 60 and thus to the differential assembly 32.

A control system 90 controls operation of the drive axle system 20. For example, the control system 90 may include one or more microprocessor-based control modules or controllers 92 that may be electrically connected to or communicate with components of the vehicle 10 and/or the axle assemblies 22, 24, such as the electric motors 36 and clutch actuators 82 of both axle assemblies 22, 24. Control system connections are represented by the double arrowed lines in FIG. 1 as well as by connection symbols A, B, C, and D. The control system 90 may also monitor and control the electric power source 28. In addition, the control system 90 may also process input signals or data from various input devices or sensors. These input devices may include a first speed sensor 100, a second speed sensor 102, a pedal 104, an operator communication device 106, or combinations thereof.

The first speed sensor 100 may detect or provide a signal indicative of the rotational speed or rotational velocity of a rotatable component disposed upstream from the clutch 80, such as the rotor 72 or a gear of the transmission 38.

The second speed sensor 102 may detect or provide a signal indicative of the rotational speed or rotational velocity of the clutch 80 or a rotatable component disposed downstream from the clutch 80, such as the drive pinion 40, the differential assembly 32, an axle shaft 34, a wheel hub or the like. The first speed sensor 100 and the second speed sensor 102 may be used in conjunction to determine when the rotational speed of the clutch 80 is sufficiently synchronized with the rotational speed of another component, such as a transmission gear, to permit movement or shifting of the clutch 80. Accordingly, the terms "synchronized" or "sufficiently synchronized" mean that the rotational speed of two components may be sufficiently close so as to permit the clutch 80 to be shifted and may not require exactly the same rotational speed.

The pedal 104 may be an input device that is operated by the driver to request acceleration and deceleration of the vehicle 10. The pedal 104 may have any suitable configuration. For instance, the pedal 104 may be a foot-operated pedal that may be mounted near the floor of the passenger compartment of the vehicle 10 or may be a hand-operated pedal that may be provided in another location, such as proximate a steering wheel or control console of the vehicle 10. A request for torque or torque command may be based on the position of the pedal 104.

The operator communication device 106 may be provided to receive an input from an operator or vehicle driver and/or provide information to an operator. The operator communication device 106 may be of any suitable type or types, such as a switch, button, sensor, display, touchscreen, keypad, voice command or speech recognition system, or the like. The operator communication device 106 may be used to input data that may not be predetermined or provided by a sensor or other input device. In addition, the operator communication device 106 may be configured to provide information to the operator, such as a warning or alert that a gear shift has not been completed. Information may be provided to an operator in one or more formats, such as an audible format, visual format, and/or haptic format.

Referring to FIGS. 2, 3, 5, and 6, flowcharts of examples of methods of controlling a drive axle system are shown. As will be appreciated by one of ordinary skill in the art, the flowcharts may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the control system 90 and may be implemented as a closed loop control system.

For clarity in reference, the axle assemblies associated with the method are referred to as a "first axle assembly" and a "second axle assembly." The first axle assembly may be either the front axle assembly 22 or the rear axle assembly 24 while the second axle assembly may be the axle assembly that is not the first axle assembly, and thus may also be other of the front axle assembly 22 or the rear axle assembly 24.

Also for clarity in reference, the first axle assembly is referred to as having a first transmission and a first electric motor. The first electric motor may provide propulsion torque or regenerative braking torque to the first transmission but not a second transmission of the second axle assembly. The first transmission has a plurality of gear ratios. These gear ratios include at least a first gear ratio and a second gear ratio. The first gear ratio and the second gear ratio of the first transmission differ from each other. For instance, the first gear ratio may have a larger numerical gear ratio than the second gear ratio. As a nonlimiting example, the first gear ratio may provide a 2:1 gear ratio or more while the second gear ratio may provide a lesser numerical gear ratio, such as 1:1. Similarly, the second axle assembly is referred to as having a second transmission and a second electric motor. The second electric motor may provide propulsion torque or regenerative braking torque to the second transmission but not the first transmission. The second transmission has a plurality of gear ratios. These gear ratios include at least a first gear ratio and a second gear ratio. The first gear ratio and the second gear ratio of the second transmission differ from each other as described above with respect to the first axle assembly.

Figure 2:
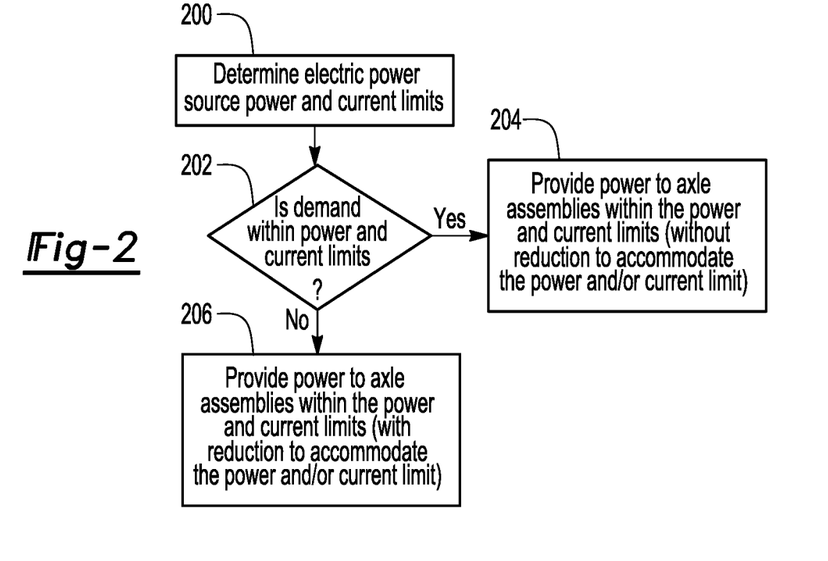
FIG. 2 is a flowchart of a method of controlling the drive axle system associated with FIG. 1.
Figure 3:
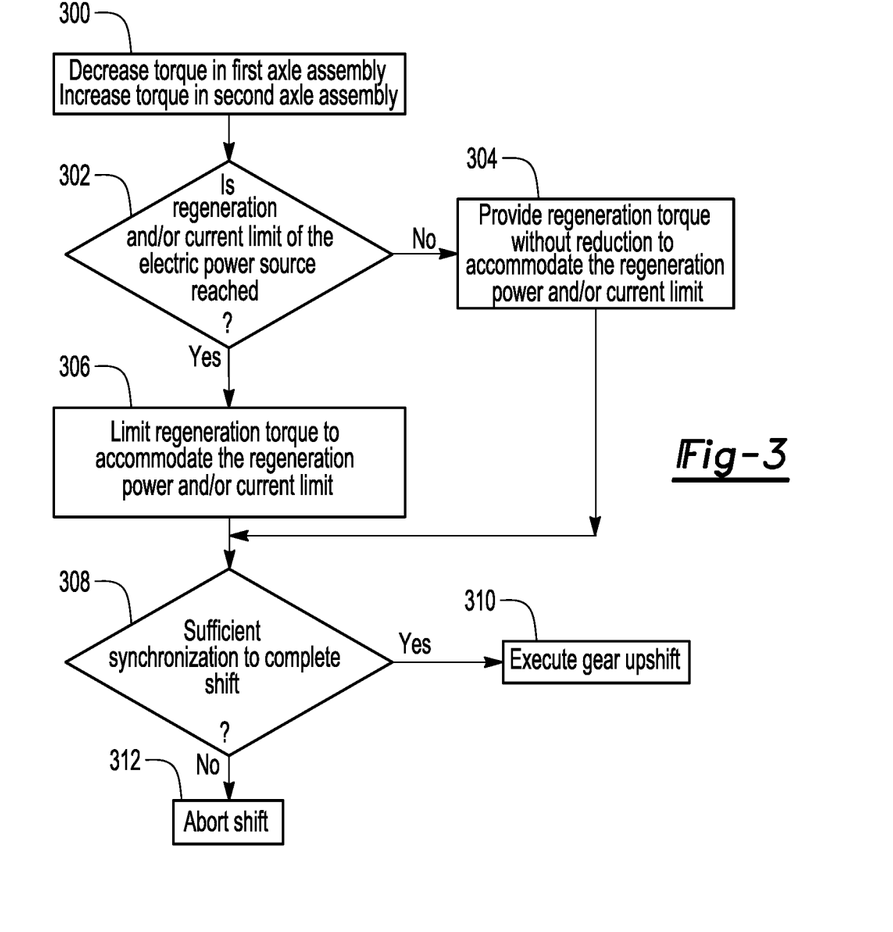
FIG. 3 is a flowchart of a method of controlling the drive axle system that is associated with FIG. 1.

Referring to FIGS. 2 and 3, as an overview a vehicle that has axle assemblies that have multi-speed transmissions and corresponding dedicated electrical motors allows each axle assembly to be independently controlled. However, the degree of independent control is limited when the axle assemblies are electrically connected to a common electric power source. The electric power source has charge and discharge power limits as well as charge and discharge current limits. Moreover, the charge and discharge power limits and the charge and discharge current limits are dynamic and vary as attributes associated with the battery, such as battery temperature, change. As a result, charging and discharging of the electric power source must be managed to keep the battery within its operating range, thereby helping protect the battery cells and maintain the battery state of health.

Referring to FIG. 2, a flowchart is shown that illustrates a method of control when the axle assemblies are electrically connected to a common electric power source and shifting of the transmissions from a current gear ratio is not desired.

At block 200, the power and current limits of the electric power source are determined. The power and current limits may be based on the attributes that affect the performance of the electric power source 28, such as the temperature of the electric power source 28. Power and current limits may be calculated or stored in a lookup table. For instance, the lookup table may associate a power limit and a current limit with different temperatures of the electric power source 28.

At block 202, the method may determine whether the power and current that is demanded is within the power and current limits. The power that is demanded or requested may be referred to as a power demand. Similarly, the current that is demanded or requested may be referred to as a current demand. The power demand and the current demand may be based on the torque that is requested to be provided by the drive axle system. The torque that is requested may be referred to as a torque request or request for torque. The torque request may be based on an operator input, such as an acceleration or deceleration request that may be provided by way of an input device, such as a pedal 104, cruise control system, autonomous driving system, or the like. Power demand and current demand values may be calculated or stored in a lookup table. For instance, a lookup table may associate power demand and current demand values with different torque requests. If the power demand and the current demand are within the power and current limits, then the method may continue at block 204. If the power demand and/or the current demand are not within the power and current limits, then the method may continue at block 206.

At block 204, power may be provided to the first and second axle assemblies within the power and current limits, but without reduction or modification to accommodate the power limit, the current limit, or both. In other words, the electric power source is capable of providing the requested power demand and the requested current demand based on its current operating state and neither the power demand nor the current demand needs to be modified. Thus, there is no need to clip or reduce the propulsion or regeneration torque that is provided with respect to the torque that is requested.

Torque may be provided to the axle assemblies in a predetermined manner or at a predetermined ratio. For instance, the control system 90 may split torque evenly or provide approximately half of the requested torque to the first axle assembly and the remainder to the second axle assembly, thereby providing a 50-50 split. It is also contemplated that torque may not be split evenly.

At block 206, power may be provided to the first and second axle assemblies within the power limit and the current limit with reduction to accommodate the power limit, the current limit, or both. In other words, the electric power source is not capable of providing the requested power demand, the requested current demand, or both, based on its current operating state. For instance, the power demand may be compared to the power limit, and the power that is provided to the first and second electric motors may be reduced to the power limit when the power demand exceeds the power limit. Thus, the control system may provide power up to the power limit when the power demand is greater than the power limit to help maintain the operating state of the battery. Similarly, the current demand may be compared to the current limit, and the current that is provided to the first and second electric motors may be reduced to the current limit when the current demand exceeds the current limit. Thus, the control system may provide current up to the current limit when the current demand is greater than the current limit to help keep the electric power source within its designed operating range. Accordingly, torque may be provided to the first axle assembly and the second axle assembly in a predetermined manner read a predetermined ratio, such as a 50-50 split, but only up to the power limit or the current limit.

Referring to FIG. 3, a flowchart is shown that illustrates a method of control when the axle assemblies are electrically connected to a common electric power source and shifting of the transmission from a current gear ratio is desired.

As an overview, shifting gears of the transmissions of both axle assemblies at the same time may result in the temporary loss of torque. In the case of propulsion torque, the temporary loss of propulsion torque can be perceived as a lack of responsiveness by the vehicle driver. To address this, the method staggers gear shifts from one gear ratio to another so that gear shifts of the first and second axle assemblies are not conducted at the same time. As a result, at least one axle assembly can continue to provide propulsion torque or regenerative braking torque. In addition, the method may temporarily redistribute torque before a gear shift is executed so that the axle assembly that is not undergoing a gear shift continues to provide the requested torque while torque is modulated in the other axle assembly to facilitate a gear shift to either a higher gear ratio or a lower gear ratio.

Referring to FIG. 3, a flowchart is shown that is associated with executing a gear upshift. The method steps shown in FIG. 3 are used to coordinate and execute a gear upshift for both axle assemblies and are configured to be implemented when both axle assemblies are sufficiently close to operating conditions in which an upshift from a first gear ratio (e.g., low speed gear ratio) to a second gear ratio (e.g., a higher speed gear ratio) is desired. For illustration purposes, the method is described under the following initial operational conditions. First, propulsion torque is being provided by both the first axle assembly and the second axle assembly. Second, the first axle assembly and the second axle assembly are providing propulsion torque via their respective first gear ratios. In addition, the total torque may initially be split substantially equally between the first axle assembly and the second axle assembly. For instance, the torque that is provided by the first electric motor to the first transmission and the torque that is provided by the second electric motor to the second transmission may be substantially equal. The term "substantially equal" as used herein means equal or very close to equal and includes output torque that is within 5% of being equal to each other.

At block 300, the propulsion torque is redistributed between the axle assemblies in preparation for a gear upshift. Torque may be reduced in the axle assembly that is to be upshifted first. Torque may be increased in at least one other axle assembly to continue to provide or attempt to provide the requested propulsion torque. For example, the torque may be decreased in the first axle assembly and the torque may be increased in the second axle assembly. Torque may be decreased in the first axle assembly by reducing the propulsion torque or increasing the regenerative braking torque provided by the first electric motor to the first transmission. Torque may be increased in the second axle assembly by increasing the propulsion torque or reducing the regenerative braking torque that is provided by the second electric motor to the second transmission. Torque may be redistributed in both axle assemblies simultaneously. Thus, the torque that is provided by the first electric motor may be reduced when the torque that is provided by the second electric motor is increased. In addition, torque may be changed proportionally. For instance, the torque provided by the first electric motor may be reduced at the same rate and by the same amount as torque provided by the second electric motor is increased.

At block 302, the method determines whether the regeneration power limit of the electric power source, the regeneration current limit of the electric power source, or both are reached. Providing regenerative braking with the first axle assembly captures energy. This energy may be used to charge the electric power source if the electric power source has sufficient capacity to accept the additional energy. The regeneration power limit and the regeneration current limit represent limits on the capability of the electric power source to accept additional energy based on its current operating state. The regeneration power limit and regeneration current limit may be based on attributes of the electric power source, such as the state of charge and operating temperature of the electric power source. Regeneration power and current limits may be calculated or stored in a lookup table that associates regeneration power and current limit values with different operating temperatures, states of charge, or both. If the regeneration power limit and the regeneration current of the electric power source are not reached, then the method may continue at block 304. If the regeneration power limit, the regeneration current limit, or both are reached, then the method may continue at block 306.

At block 304, regeneration torque is provided without reduction to accommodate the regeneration power limit and/or the regeneration current limit. As such, regenerative braking may be provided with the first electric motor to slow rotation of the first electric motor and a gear of the first transmission to facilitate a gear shift. The regenerative braking that is provided with the first electric motor may not be clipped or reduced so as to not exceed the regeneration power limit and/or the regeneration current limit as the regeneration torque can be provided within the regeneration power and current limits. The method may continue at block 308.

At block 306, regeneration torque is provided but is limited to accommodate the regeneration power limit, the regeneration current limit, or both. As such, regenerative braking may be provided with the first electric motor to slow rotation of the first electric motor and a gear of the first transmission but at a slower rate and/or by a lesser magnitude to reduce the amount of electrical energy is provided by the first electric motor to the electric power source. This may help prevent overcharging of the electric power source, overheating of the electric power source, or both.

At block 308, the method determines whether there is sufficient synchronization to complete the gear shift. As previously discussed, regeneration torque may reduce the rotational speed of gear of the first transmission, which may help synchronize the rotational speed of a clutch 80 with the rotational speed of the gear so that there is sufficient synchronization of the rotational speeds to permit successful movement of the clutch, such as movement from the neutral position to engage the gear. The controller 92 may determine whether sufficient synchronization is present based on signals from the first speed sensor 100 and the second speed sensor 102. For example, sufficient synchronization may be present when the speed or velocity indicated by the signal from the first speed sensor 100 is sufficiently close or within a threshold amount or threshold range of the speed or velocity indicated by the signal from the second speed sensor 102. The gear upshift may be deemed completable when there is sufficient synchronization and may not be deemed completable when sufficient second is not present. If sufficient synchronization is achieved to complete the gear shift, then the method may continue at block 310. If sufficient synchronization to complete the gear shift is not achieved, then the method may continue at block 312.

At block 310, the gear upshift of the first axle assembly may be executed. The gear upshift may be executed by disengaging the first gear ratio of the first axle assembly and engaging the second gear ratio of the first axle assembly (i.e., the gear of the first transmission that is associated with the second gear ratio). For instance, a clutch actuator 82 of the first axle assembly may be operated to move a clutch 80 of the first axle assembly. It is contemplated that the method may attempt to complete the gear upshift for a predetermined period of time, such as one second or less, and then may abort the shift if the shift is not successfully executed and teeth of the clutch 80 do not mate or mesh with corresponding teeth of the gear that is to be engaged.

Once the gear upshift of the first axle assembly is successfully executed or completed, the torque may be redistributed. For instance, the propulsion torque that is provided with the first electric motor to the first transmission may be increased while the propulsion torque that is provided by the second electric motor to the second transmission may be reduced (e.g., regeneration torque is provided by the second electric motor to slow rotation of the second transmission). Torque redistribution may occur simultaneously and proportionally between the axle assemblies. The method steps starting at block 302 may then be executed to conduct or attempt to conduct a gear upshift on the second axle assembly.

At block 312, the shift may be aborted or may not be executed. The gear upshift may not be executed when the first electric motor provides regeneration torque but does not slow rotation of the gear of the first transmission is to be engaged by a sufficient amount to obtain sufficient synchronization complete the gear upshift. Aborting the shift may include operating the clutch actuator 82 to actuate the clutch 80 back to the neutral position. Moving the clutch 80 back to the neutral position may help prevent overheating of the clutch actuator 82 and potential wear of the clutch and/or the gear that was to be engaged. Aborting the shift may also include providing an error signal. The error signal may trigger a notification to the vehicle operator via the operator communication device 106, a diagnostic code to facilitate assessment and maintenance, or both.

Figure 4:
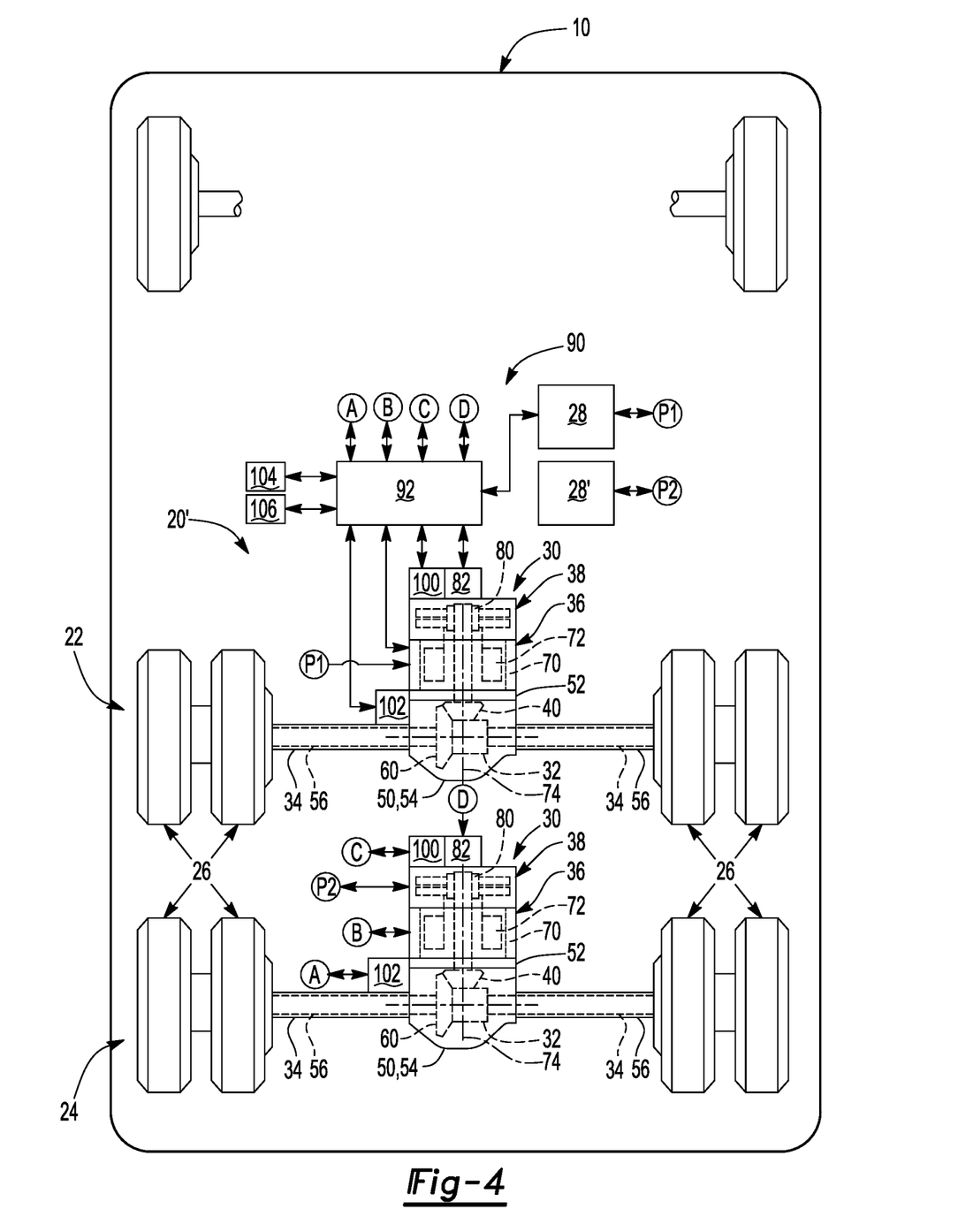
FIG. 4 is a schematic representation of a vehicle having a drive axle system that includes first and second axle assemblies that are electrically connected to different power sources.

Referring to FIG. 4, an example of a vehicle 10 that includes a drive axle system 20' is shown. The drive axle system 20' is the same as that shown in FIG. 1 except that each axle assembly 22, 24 is electrically connected to a different electric power source 28, 28'. The front axle assembly 22 is electrically connected to the first electric power source 28 but is not electrically connected to the second electric power source 28'. Thus, the electric motor 36 of the front axle assembly 22 is electrically connected to the first electric power source 28 and is not electrically connected to the second electric power source 28'. The rear axle assembly 24 is electrically connected to the second electric power source 28' but is not electrically connected to the first electric power source 28. Thus, the electric motor 36 of the rear axle assembly 24 is electrically connected to the second electric power source 28' and is not electrically connected to the first electric power source 28. "Electrically connected" is again used in the context of providing electrical energy to drive an electric power source or providing electrical energy from the electric power source to the electrical power source rather than a control system or other component or subsystem that may be wired to the electrical power source and the electric motor to monitor or control operation of the drive axle system 20.

The control system 90 controls operation of the drive axle system 20' as previously described and may monitor and control operation of both the first electric power source 28 and the second electric power source 28'.

Figure 5:
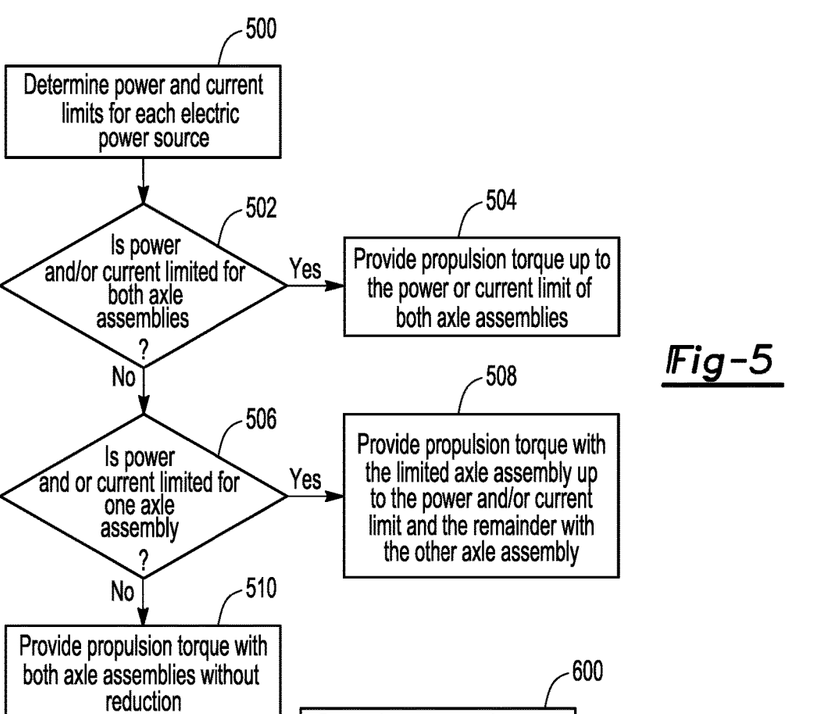
FIG. 5 is a flowchart of a method of controlling propulsion torque of the drive axle system associated with FIG. 4.

Referring to FIG. 5, a flowchart is shown that is associated with controlling propulsion torque that is provided to the first and second axle assemblies that are electrically connected to different power sources. In addition, shifting of the transmissions from a current ratio may not be desired.

At block 500, the power and current limits of the electric power sources are determined for the first electric power source 28 in the second electric power source 28'. The power and current limits may be associated with providing propulsion torque. The power limit of the first electric power source 28 may be referred to as a first propulsion power limit. The current limit of the first electric power source 28 may be referred to as a first propulsion current limit. The power limit of the second electric power source 28' may be referred to as a second propulsion power limit. The current limit of the second electric power source 28' may be referred to as a second propulsion current limit. The power and current limits may be based attributes of the electric power sources 28, 28', such as the respective temperatures of the electric power source 28, 28'. Propulsion power and current limits may be calculated or stored in a lookup table. For instance, the lookup table may associate a power limit and a current limit with different temperatures of the first electric power source 28 and different temperatures of the second electric power source 28'.

At block 502, the method may determine whether the power and/or current that is demanded for each axle assembly is within the power and current limits associated with each electric power source 28, 28'. The control system may oversee the distribution of torque between the axle assemblies based on a propulsion torque command. The propulsion torque command may be based on the total torque that is requested to be provided by the vehicle operator, which may be based on a signal from the pedal 104. For instance, the propulsion torque command may be indicative of a request for acceleration. In addition, implementing the propulsion torque command may default to providing an approximately even distribution or 50-50 split between the axle assemblies. For convenience in reference, the power that is associated with the propulsion torque that is to be provided with the first electric motor may be referred to as a first power request, and the current that is associated with the propulsion torque that is to be provided with the first electric motor may be referred to as a first current request. Similarly, the power that is associated with the propulsion torque that is to be provided with the second electric motor may be referred to as a second power request, and the current that is associated with the propulsion torque that is to be provided with the second electric motor may be referred to as a second current request.

Power and/or current that can be provided by each electric power source 28, 28' may be insufficient to provide the propulsion torque that is requested of each axle assembly. For instance, an electric power source may be unable to provide the power or current that is requested when the state of charge of its associated electric power source is insufficient to meet the power or current demand or at high electric power source temperatures that may limit the performance of the electric power source. A power limitation exists when the first power request is greater than the first propulsion power limit and/or the second power request is greater than the second propulsion power limit. Similarly, a current limitation exists when the first current request is greater than the first propulsion current limit and/or the second current request is greater than the second propulsion current limit. If both axle assemblies are limited by their electric power sources (i.e., have a power limitation, a current limitation, or both), then the method may continue at block 504. If neither axle assembly is limited by its electric power source (i.e., there is no power or current limitation associated with either axle assembly or its electric power source), then the method may continue at block 506.

At block 504, the propulsion torque is provided up to the power and/or current limits of both axle assemblies. For instance, propulsion torque may be provided with the first electric motor without exceeding the first propulsion power limit when the first power request is greater than the first propulsion power limit. Propulsion torque may be provided with the first electric motor without exceeding the first propulsion current limit when the first current request is greater than the first propulsion current limit. Propulsion torque may be provided with the second electric motor without exceeding the second propulsion current limit when the second power request is greater than the second propulsion power limit. Propulsion torque may be provided with the second electric motor without exceeding the second propulsion current limit when the second current request is greater than the second propulsion current limit. As a result, both axle assemblies may be clipped or operated to provide propulsion torque that is less than the proportion of the propulsion torque command that would normally be provided if the power and/or current limits were not reached.

At block 506, the method determines whether the power and/or current that is demanded of one axle assembly is within the power and current limits of its associated electric power source 28, 28'. In other words, the method determines whether the power and/or current that is demanded is limited for one axle assembly but not the other. A power limitation may exist for the first axle assembly when the first power request is greater than the first propulsion power limit. A current limitation may exist for the first axle assembly when the first current request is greater than the first current power limit. A power limitation may exist for the second axle assembly when the second power request is greater than the second propulsion power limit. A current limitation may exist for the second axle assembly when the second current request is greater than the second propulsion current limit. If one axle assembly has power and/or current limitations but the other axle assembly does not, then the method may continue at block 508. If one axle assembly does not have power and/or current limitations, then power and current is not limited by the electric power sources for either axle assembly and the method continues at block 510.

At block 508, the propulsion torque is provided up to the power and/or current limits of the axle assembly that is limited by its electric power source while the remainder of the propulsion torque requested is provided by the other axle assembly that is not limited by its electric power source with respect to its power and current limits. For instance, when the first axle assembly is the limited axle assembly, propulsion torque may be provided with the first electric motor at the first propulsion power limit when the first power request is greater than the first propulsion power limit. Similarly, propulsion torque may be provided with the first electric motor at the first propulsion current limit when the first current request is greater than the first propulsion current limit. Meanwhile, the second electric motor may provide more propulsion torque or a greater amount of propulsion torque than the first electric motor to meet the propulsion torque demand. For instance, the controller may determine the amount of propulsion torque that is provided by the first electric motor and subtract that amount from the propulsion torque demand, resulting in the amount of propulsion torque to be provided by the second electric motor.

Conversely, if the second electric motor is limited by second electric power source 28' with respect to its power and/or current limits, then propulsion torque may be limited at the second axle assembly rather than the first axle assembly. For instance, propulsion torque may be provided with the second electric motor at the second propulsion power limit when the second power request is greater than the second propulsion power limit. Similarly, propulsion torque may be provided with the second electric motor at the second propulsion current limit when the second current request is greater than the second propulsion current limit. Meanwhile, the first electric motor may provide more propulsion torque or a greater amount of propulsion torque than the second electric motor to meet the propulsion torque demand. For instance, the controller may determine the amount of propulsion torque that is provided by the second electric motor and subtract that amount from the propulsion torque demand, resulting in the amount of propulsion torque to be provided by the first electric motor.

At block 510, propulsion torque may be provided with both axle assemblies without reduction to accommodate power and/or current limits of both axle assemblies since the power and current limits for each electric power source are not reached. Thus, propulsion torque may be provided with the first electric motor in accordance with the first power request and the first current request and propulsion torque may be provided with the second electric motor in accordance with the second power request and the second current request. The total propulsion torque or propulsion torque associated with the propulsion torque command may be split in a predetermined ratio between the first axle assembly and the second axle assembly when neither axle assembly is limited (i.e., when the first power request does not exceed the first propulsion torque limit, the first current request does not exceed the first propulsion current limit, the second power request does not exceed the second propulsion power limit, and the second current request does not exceed the second propulsion current limit). The predetermined ratio may split propulsion torque evenly between the first axle assembly and the second axle assembly or in a non-even manner as previously discussed.

Figure 6:
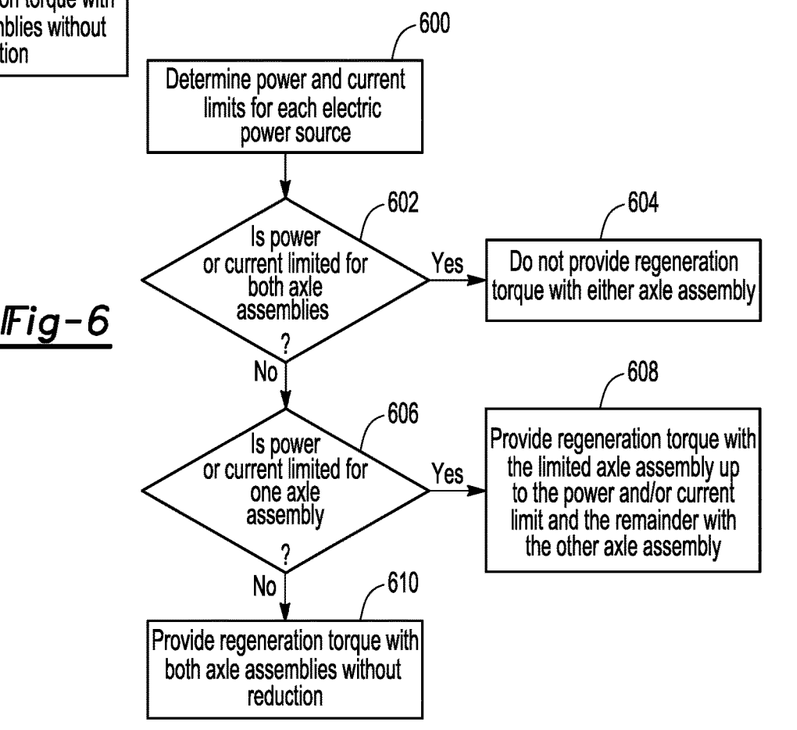
FIG. 6 is a flowchart of a method of controlling regeneration torque of the drive axle system associated with FIG. 4.

Referring to FIG. 6, a flowchart is shown that is associated with controlling regeneration torque that is provided to the first and second axle assemblies that are electrically connected to different power sources. In addition, shifting of the transmissions from a current ratio may not be desired.

At block 600, the power and current limits of the electric power sources are determined for the first electric power source 28 in the second electric power source 28'. The power and current limits may be associated with regeneration torque or a request for regenerative braking torque, such as may be provided to slow the vehicle and charge a corresponding electrical power source. The power limit of the first electric power source 28 may be referred to as a first regeneration power limit. The current limit of the first electric power source 28 may be referred to as a first regeneration current limit. The power limit of the second electric power source 28' may be referred to as a second regeneration power limit. The current limit of the second electric power source 28' may be referred to as a second regeneration current limit. The regeneration power and current limits may be based attributes of the electric power sources 28, 28', such as the respective temperatures of the electric power source 28, 28'. Regeneration power and current limits may be calculated or stored in a lookup table. For instance, the lookup table may associate a power limit and a current limit with different temperatures of the first electric power source 28 and different temperatures of the second electric power source 28'.

At block 602, the method may determine whether the power and/or current that is demanded for each axle assembly is within the power and current limits associated with each electric power source 28, 28'. The control system 90 may oversee the distribution of torque between the axle assemblies based on a regeneration torque command. The regeneration torque command may be based on the total torque that is requested to be provided by the vehicle operator, which may be based on a signal from the pedal 104. For instance, the regeneration torque command may be indicative of a request for deceleration. In addition, the implementing the regeneration torque command may default to providing an approximately even distribution or 50-50 split between the axle assemblies. For convenience in reference, the power that is associated with the regeneration torque that is to be provided with the first electric motor may be referred to as a first power request, and the current that is associated with the regeneration torque that is to be provided with the first electric motor may be referred to as a first current request. Similarly, the power that is associated with the regeneration torque that is to be provided with the second electric motor may be referred to as a second power request, and the current that is associated with the regeneration torque that is to be provided with the second electric motor may be referred to as a second current request.

Power and/or current that can be provided by each electric power source 28, 28' may be insufficient to provide the regenerative braking torque that is requested of each axle assembly. For instance, an electric power source may be unable to accommodate the power or current that is requested when the state of charge of its corresponding electric power source is too high and insufficient to receive the electrical energy provided by its electric motor during regenerative braking or when the charging capability of the electric power source is sufficiently limited by its operating temperature. A power limitation exists when the first power request is greater than the first regeneration power limit and/or the second power request is greater than the second regeneration power limit. Similarly, a current limitation exists when the first current request is greater than the first regeneration current limit and/or the second current request is greater than the second regeneration current limit. If both axle assemblies are limited by their electric power sources (i.e., have a power limitation, a current limitation, or both), then the method may continue at block 604. If neither axle assembly is limited by its electric power source (i.e., there is no power or current limitation associated with either axle assembly or its electric power source), then the method may continue at block 606.

At block 604, regeneration torque is not provided with either axle assembly. This is because the electric power sources 28, 28' are both limited in a manner that makes further charging undesirable. As an example, regeneration torque may not be provided with the first electric motor or the second electric motor when the electric power sources 28, 28' are fully charged.

At block 606, the method determines whether the power and/or current that is demanded of one axle assembly is within the power and current limits of its associated electric power source 28, 28'. In other words, the method determines whether the power and/or current that is associated with the regeneration torque demanded is limited for one axle assembly but not the other. A power limitation may exist for the first axle assembly when the first power request is greater than the first regeneration power limit. A current limitation may exist for the first axle assembly when the first current request is greater than the first regeneration current limit. A power limitation may exist for the second axle assembly when the second power request is greater than the second regeneration power limit. A current limitation may exist for the second axle assembly when the second current request is greater than the second regeneration current limit. If one axle assembly has power and/or current limitations by its electric power source but the other axle assembly does not, then the method may continue at block 608. If one axle assembly does not have power and/or current limitations, then power and current is not limited by the electric power sources for either axle assembly and the method continues at block 610.

At block 608, the regeneration torque is provided up to the power and/or current limits of the axle assembly that is limited by its electric power source while the remainder of the regeneration torque requested is provided by the other axle assembly that is not limited by its electric power source with respect to its power and current limits. For instance, when the first axle assembly is the limited axle assembly, regeneration torque may be provided with the first electric motor at the first regeneration power limit when the first power request is greater than the first regeneration power limit. Similarly, regeneration torque may be provided with the first electric motor at the first regeneration current limit when the first current request is greater than the first regeneration current limit. Meanwhile, the second electric motor may provide more regeneration torque than the first electric motor to meet the regeneration torque demand. For instance, the controller may determine the amount of regeneration torque that is provided by the first electric motor and subtract that amount from the regeneration torque demand, resulting in the amount of regeneration torque to be provided by the second electric motor.

Conversely, if the second electric motor is limited by second electric power source 28' with respect to its power and/or current limits, then regeneration torque may be limited at the second axle assembly rather than the first axle assembly. For instance, regeneration torque may be provided with the second electric motor at the second regeneration power limit when the second power request is greater than the second regeneration power limit. Similarly, regeneration torque may be provided with the second electric motor at the second regeneration current limit when the second current request is greater than the second regeneration current limit. Meanwhile, the first electric motor may provide more regeneration torque or a greater amount of regeneration torque than the second electric motor to meet the regeneration torque demand. For instance, the controller may determine the amount of regeneration torque that is provided by the second electric motor and subtract that amount from the regeneration torque demand, resulting in the amount of regeneration torque to be provided by the first electric motor.

At block 510, regeneration torque may be provided with both axle assemblies without being limited to accommodate power and/or current limits of both axle assemblies since the power and current limits for each electric power source are not reached. Thus, regeneration torque may be provided with the first electric motor in accordance with the first power request and the first current request and regeneration torque may be provided with the second electric motor in accordance with the second power request and the second current request. The total regeneration torque or regeneration torque associated with the regeneration torque command may be split in a predetermined ratio between the first axle assembly and the second axle assembly when neither axle assembly is limited (i.e., when the first power request does not exceed the first regeneration torque limit, the first current request does not exceed the first regeneration current limit, the second power request does not exceed the second regeneration power limit, and the second current request does not exceed the second regeneration current limit). The predetermined ratio may split regeneration torque evenly between the first axle assembly and the second axle assembly or in a non-even manner as previously discussed.

A drive axle system and method as described above provides different methods of control when axle assemblies are electrically connected to a common electric power source or different electric power sources. The method may allow multiple axle assemblies to operate within the charge and discharge power and current limits of an associated electric power source. Moreover, the methods may allow one axle assembly to provide propulsion or regeneration torque that cannot currently be provided by the other axle assembly due to the transient performance limitations of an electric power source. In addition, the methodologies may be operated iteratively and may accommodate changes in torque requests and the performance attributes of an electric power source in real-time, thereby allowing torque to be altered as performance attributes change, thereby improving the performance of the drive axle system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling a drive axle system, the method comprising:
    determining a regeneration power limit and a regeneration current limit of an electric power source of the drive axle system, the drive axle system including a first axle assembly having a first transmission and a first electric motor that is configured to provide torque to the first transmission, and a second axle assembly having a second transmission and a second electric motor that is configured to provide torque to the second transmission, wherein the first electric motor and the second electric motor are electrically connected to the electric power source; and
    providing regeneration torque with the first electric motor to the first transmission to reduce a rotational speed of a gear of the first transmission and providing increased propulsion torque with the second electric motor to the second transmission in preparation for a gear upshift of the first transmission;
    determining whether the regeneration power limit of the electric power source is reached when providing regeneration torque, and providing regeneration torque with the first electric motor without exceeding the regeneration power limit when the regeneration power limit is reached; and
    determining whether the regeneration current limit of the electric power source is reached when providing regeneration torque and providing regeneration torque with the first electric motor without exceeding the regeneration current limit when the regeneration current limit is reached.

2. The method of claim 1 wherein determining whether the regeneration power limit of the electric power source is reached includes limiting the regeneration torque provided by the first electric motor to not exceed the regeneration power limit; and
    determining whether the regeneration current limit of the electric power source is reached includes limiting the regeneration torque provided by the first electric motor to not exceed the regeneration current limit.

3. The method of claim 1 further comprising determining whether the gear upshift of the first transmission is completable and executing the gear upshift by disengaging a first gear ratio of the first axle assembly and engaging the gear to provide a second gear ratio of the first axle assembly when the gear upshift of the first transmission is completable.

4. The method of claim 3 further comprising providing propulsion torque with the first electric motor to the first transmission to increase the rotational speed of the gear of the first transmission and reducing the propulsion torque provided with the second electric motor to the second transmission in preparation for a gear upshift of the second transmission after completing the gear upshift of the first transmission.

5. The method of claim 1 further comprising not executing the gear upshift of the first transmission when the first electric motor does not slow rotation of the gear of the first transmission by a sufficient amount to complete the gear upshift when the regeneration torque is provided by the first electric motor.

6. A method of controlling a drive axle system, the method comprising:

determining a first propulsion power limit and a first propulsion current limit of a first electric power source of the drive axle system, and determining a second propulsion power limit and a second propulsion current limit of a second electric power source of the drive axle system, the drive axle system including a first axle assembly having a first transmission and a first electric motor that is configured to provide torque to the first transmission, and a second axle assembly having a second transmission and a second electric motor that is configured to provide torque to the second transmission, wherein the first electric motor is electrically connected to the first electric power source and not to the second electric power source and the second electric motor is electrically connected to the second electric power source and not to the first electric power source;

providing propulsion torque with the first electric motor without exceeding the first propulsion power limit when a first power request based on a propulsion torque command is greater than the first propulsion power limit;

providing propulsion torque with the first electric motor without exceeding the first propulsion current limit when a first current request based on the propulsion torque command is greater than the first propulsion current limit;

providing propulsion torque with the second electric motor without exceeding the second propulsion power limit when a second power request based on the propulsion torque command is greater than the second propulsion power limit; and providing propulsion torque with the second electric motor without exceeding the second propulsion current limit when a second current request based on the propulsion torque command is greater than the second propulsion current limit.

7. The method of claim 6 further comprising providing propulsion torque with the first electric motor at the first propulsion power limit when the first power request is greater than the first propulsion power limit and providing propulsion torque with the first electric motor at the first propulsion current limit when the first current request is greater than the first propulsion current limit; and providing propulsion torque with the second electric motor that is greater than the propulsion torque provided by the first electric motor.

8. The method of claim 7 wherein the propulsion torque is split between the first axle assembly and the second axle assembly such that the propulsion torque that is not provided by the first electric motor is provided by the second electric motor.

9. The method of claim 6 further comprising providing propulsion torque with the second electric motor at the second propulsion power limit when the second power request is greater than the second propulsion power limit and providing propulsion torque with the second electric motor at the second propulsion current limit when the second current request is greater than the second propulsion current limit; and providing propulsion torque with the first electric motor that is greater than the propulsion torque provided by the second electric motor.

10. The method of claim 9 wherein the propulsion torque is split between the first axle assembly and the second axle assembly such that the propulsion torque that is not provided by the second electric motor is provided by the first electric motor.

11. The method of claim 6 wherein propulsion torque is split in a predetermined ratio between the first axle assembly and the second axle assembly when the first power request does not exceed the first propulsion power limit, the first current request does not exceed the first propulsion current limit, the second power request does not exceed the second propulsion power limit, and the second current request does not exceed the second propulsion current limit.

12. The method of claim 11 wherein the predetermined ratio splits propulsion torque evenly between the first axle assembly and the second axle assembly.

13. A method of controlling a drive axle system, the method comprising:

determining a first regeneration power limit and a first regeneration current limit of a first electric power source of the drive axle system, and determining a second regeneration power limit and a second regeneration current limit of a second electric power source of the drive axle system, the drive axle system including a first axle assembly having a first transmission and a first electric motor that is configured to provide torque to the first transmission, and a second axle assembly having a second transmission and a second electric motor that is configured to provide torque to the second transmission, wherein the first electric motor is electrically connected to the first electric power source and not to the second electric power source and the second electric motor is electrically connected to the second electric power source and not to the first electric power source;

providing no regeneration torque with the first electric motor when a first power request based on a regeneration torque command exceeds the first regeneration power limit, a first current request based on the regeneration torque command exceeds the first regeneration current limit, or the first power request exceeds the first regeneration power limit and the first current request exceeds the first regeneration current limit; and providing no regeneration torque with the second electric motor when a second power request based on the regeneration torque command exceeds the second regeneration power limit, a second current request based on the regeneration torque command exceeds the second regeneration power limit, or the second power request exceeds the second regeneration power limit and the second current request exceeds the second regeneration current limit.

14. The method of claim 13 further comprising providing regeneration torque with the first electric motor at the first regeneration power limit when the first power request is greater than the first regeneration power limit and providing regeneration torque with the first electric motor at the first regeneration current limit when the first current request is greater than the first regeneration current limit; and providing regeneration torque with the second electric motor that is greater than the regeneration torque provided by the first electric motor.

15. The method of claim 14 wherein the regeneration torque is split between the first axle assembly and the second axle assembly such that the regeneration torque that is not provided by the first electric motor is provided by the second electric motor.

16. The method of claim 13 further comprising providing regeneration torque with the second electric motor at the second regeneration power limit when the second power request is greater than the second regeneration power limit and providing regeneration torque with the second electric motor at the second regeneration current limit when the second current request is greater than the second regeneration current limit; and providing regeneration torque with the first electric motor that is greater than the regeneration torque provided by the second electric motor.

17. The method of claim 1 wherein determining the regeneration power limit is based on a temperature of the electric power source.

18. The method of claim 1 wherein determining the regeneration current limit is based on a temperature of the electric power source.

19. The method of claim 6 wherein determining the first propulsion power limit is based on a temperature of the first electric power source.

20. The method of claim 6 wherein determining the second propulsion power limit is based on a temperature of the second electric power source.

* * * * *